Aug. 31, 1926.
C. P. RYAN
1,598,315
SUBMARINE SOUND RECEIVER
Filed Feb. 27, 1924
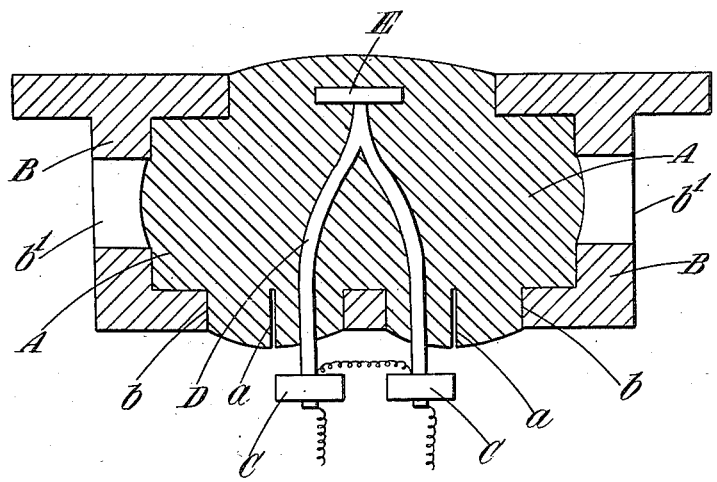
Inventor
Cyril Percy Ryan
By
Pennie, Davis, Marvin Edmonds
Attorneys Patented Aug. 31, 1926.

1,598,315

UNITED STATES PATENT OFFICE.

CYRIL PERCY RYAN, OF DROXFORD, ENGLAND, ASSIGNOR TO VICKERS LIMITED, OF WESTMINSTER, ENGLAND, A BRITISH COMPANY.

SUBMARINE SOUND RECEIVER.

Application filed February 27, 1924, Serial No. 695,396, and in Great Britain May 14, 1923.

This invention relates to submarine sound receivers or hydrophones employing rubber diaphragms and microphones.

To withstand the pressure of the external water a rubber diaphragm requires to be made of considerable thickness and it has been found that with a microphone mounted on the inner side of such diaphragm sound waves received by the rubber are largely wasted by spreading throughout the mass of rubber and only a small part reaches the microphone. The amplitude at the microphone is consequently considerably less than that at the outer surface of the massive diaphragm and therefore it has been the practice to use metal diaphragms, although the noise due to the movement of the water over the surface is greatly reduced by the use of rubber. According to this invention a thick diaphragm of rubber (or rubber-like material) has embedded in it a rigid plate, a little behind the outer face, which plate is connected to the microphone by a rigid rod passing through the diaphragm.

The rubber diaphram is secured at its periphery in a water tight manner and to give it full but also yielding support it is enclosed in a casing formed with holes or of grid type so that the rubber can expand at the unsupported parts of its surface. The rubber mass may also be slit at suitable points to provide increased freedom of expansion.

In order that the said invention may be clearly understood and readily carried into effect, the same will now be described more fully with reference to the accompanying drawing, which shows in section a submarine sound receiver or hydrophone embodying this invention.

A is the thick rubber diaphragm, which as shown is of massive type, and is secured in a water tight manner in the casing B. C, C are a pair of microphones, two being shown mounted on the rigid forked member or rod D, the outer end of which is secured to the rigid plate E. The term "microphone" is intended to cover any suitable form of electrical transmitter. The term "rubber" is also employed to cover any equivalent resilient yielding material of rubber-like characteristics which may be found suitable for a hydrophone of the present type.

To give the massive rubber diaphragm yielding support, so as to allow the required freedom to the oscillating plate E and the rigid connection D, the casing is made with openings at $b$ to allow the rubber at the back of the diaphragm to bulge out and slits $b'$ are also preferably provided around the sides of the casing to allow of expansion of the rubber around the periphery. The rubber diaphragm also may be provided with slits at the back and sides if required, the slits being indicated at $a$.

With this method of transmitting the sound vibrations to the microphone practically the full amplitude of the oscillations as received at the diaphragm surface is utilized at the microphone owing to the rigidity of the rod and the fact that the plate is placed close up to the surface and is firmly embedded in the rubber.

What I claim and desire to secure by Letters Patent of the United States is:—

1. In a submarine sound receiver, a thick rubber diaphragm adapted to receive compressional waves, a rigid plate embedded in the mass of the diaphragm a short distance behind its outer face, an electrical oscillation transmitter, a rigid connection between said rigid plate and the transmitter, and a rigid casing in which the said rubber diaphragm is secured, which casing is formed with apertures at the rear of the diaphragm which permit of yielding of the diaphragm mass.

2. In a submarine sound receiver, a thick rubber diaphragm adapted to receive compressional waves, a rigid plate embedded in the mass of the diaphragm a short distance behind its outer face, an electrical oscillation transmitter, a rigid connection between said rigid plate and the transmitter, and a rigid casing in which the said rubber diaphragm is secured, which casing is formed with apertures at the back and the sides of the diaphragm which permit of yielding of the diaphragm mass.

3. In a submarine sound receiver, a thick rubber diaphragm having slits at the rear to provide freedom of expansion, a rigid perforated casing carrying the said diaphragm and permitting of yielding of the diaphragm at the perforations, a rigid plate embedded in the diaphragm, an electrical oscillation transmitter and a rigid connection from the said embedded plate to the electrical oscillation transmitter.

CYRIL PERCY RYAN.